Patented July 9, 1940

2,207,257

UNITED STATES PATENT OFFICE 2,207,257

MANUFACTURE OF FATTY ESTERS

Roland Kapp, Newark, N. J., assignor to National Oil Products Company, Harrison, N. J., a corporation of New Jersey No Drawing. Application February 10, 1938, Serial No. 189,903

12 Claims. (Cl. 260—411)

The invention relates, in general, to a process of producing degraded glycerides and, more particularly, to a process of producing mono and diglycerides of the higher fatty acids directly from their corresponding triglycerides and to correlated improvements in the products so produced.

The mono and diglycerides of higher fatty acids are becoming of increasing technical and practical interest because of their pronounced emulsifying and other valuable properties. Curiously enough, while the triglycerides of higher fatty acids constitute the major portion of most all fish, animal and vegetable oils and fats, the mono and diglycerides do not exist in nature. In view of the fact that these mono and diglycerides were of minor importance until recently, relatively few methods for producing the same have been available. The classical method of preparing them is that of reacting a glyceryl chlorhydrin with a fatty acid; another being that of reacting glycerol with a free fatty acid in an amount sufficient to react with only one or two of the hydroxyl groups in the glycerol molecule. Neither of these methods has proven commercially satisfactory due to the difficulty of control, the relatively high temperatures involved and the low yield obtained.

It has been proposed to produce mono and diglycerides by reacting triglycerides with glycerol with the aid of catalysts. It has further been proposed to prepare these glycerides by reacting an alkali metal glycerate with a higher fatty acid at about 100° C. to 200° C. or by reacting glycerin with a higher fatty acid at 100° C. to 200° C. in the presence of an alkali metal glycerate as a catalyst. The aforementioned processes have enjoyed but limited success due to the difficulty of control, the high temperatures involved, the high cost of the materials employed and other various disadvantages resulting in the practice thereof.

The general object of the invention is to obviate the foregoing and other disadvantages.

A specific object of the invention is to provide an improved process of producing mono and diglycerides directly from triglycerides of higher fatty acids.

Other objects of the invention will in part be obvious and will in part appear hereinafter.

According to the invention the process comprises producing degraded glycerides of higher fatty acids by partially saponifying naturally occuring triglycerides in the presence of a suitable solvent vehicle. A strong alkali is preferably used in an amount sufficient to react with only one or two of the three available ester groups in the triglyceride molecule. The degraded glycerides formed during the reaction may be removed from the reacted mass in any suitable manner.

The invention accordingly comprises the several steps and the relation of one or more of such steps with respect to each of the others thereof, which will be exemplified in the process hereinafter disclosed, and the scope of the invention will be indicated in the claims.

A novel method of preparing mono and diglycerides has now been discovered and which is far superior in many respects to the methods heretofore known. Mono and diglycerides are produced, according to the process of the invention, directly from any suitable triglyceride at a relatively low temperature. The reaction may be easily controlled so as to obtain a preponderance of either the mono or the diglyceride in the resulting degraded glyceride mixture. The degraded glycerides are produced according to the invention by partially saponifying a triglyceride in the presence of an inert solvent vehicle.

In its broadest aspects the process of the invention relates to reactions of the following type, the first illustrating the formation of a diglyceride and the second showing the production of a monoglyceride:

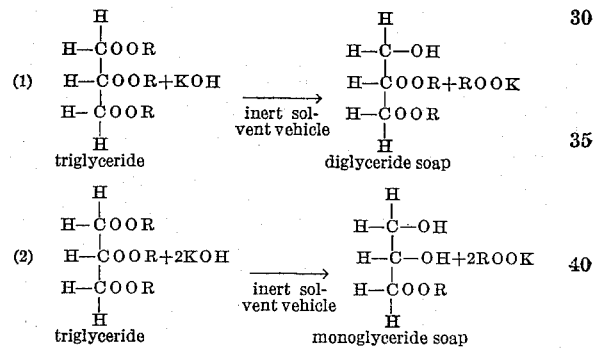

It is obvious that the monoglyceride can be made according to the present invention by treating a diglyceride with a molar equivalent of a strong alkali.

In carrying out the process of the invention, any suitable triglyceride or a mixture of the same, as well as an oil rich in triglycerides, may be employed such, for example, as olive oil, rapeseed oil, teaseed oil, cottonseed oil, cocoanut oil, soya bean oil, rice bran oil, sesame oil, corn oil, fish oils, etc. While any suitable strong alkali such as KOH, NaOH, etc., may be employed in effectuating the above reactions, it has been found that KOH gives the best results and its use is, therefore, highly preferred. The temperature at which saponification is carried out preferably lies within the range of 30° C. to 45° C. and for best results should not exceed 50° C.

The inert solvent vehicles used in carrying out the process of the invention are those which are characterized by the property of serving as a medium in which partial saponification of the triglycerides may be successfully accomplished and whereby the reaction products thus obtained may be properly recovered. It has been found that diethylene glycol is far superior to any solvent vehicle found thus far and is, therefore, highly preferred. However, other glycol derivatives may be effectively employed as the solvent vehicle in practicing the present process, such for example, as triethylene glycol, isobutylene glycol, or solvent mixtures such as propylene glycol and diethylene glycol dilaurate, propylene glycol and tricresyl phosphate and the like.

Emulsifiers comprising degraded glycerides, a soap, and a glycol solvent, which emulsifiers are prepared in accordance with the process above described, are disclosed and claimed in my copending application Serial No. 189,901, filed February 10, 1938.

For a fuller understanding of the nature and objects of the invention, reference is made to the following examples which are given merely to further illustrate the invention, and they should not be construed in a limiting sense.

*Example I*

62 parts of a 45% aqueous solution of KOH are added with stirring to 442 parts of olive oil dispersed in 125 parts of diethylene glycol and the mixture warmed to about 45° C. to effect partial saponification of the olive oil. This mixture is originally cloudy but after partial saponification has taken place, the mixture becomes clear. During this reaction most of the olive oil is split to form potassium oleate, glyceryl monooleate and glycerol dioleate. In order to recover the degraded glycerides the resulting batch may be acidified with any suitable acid such as HCl, thereby forming two distinct layers, the lower one containing potassium chloride, diethylene glycol and water and the upper layer containing the glycerides and the fatty acid which is formed from the acidifying of the potassium soap. The diethylene glycol may be recovered in any suitable manner for reuse. The upper layer after separation from the lower layer is treated with a weak alkali such as aqueous ammonia thereby forming an ammonium soap. The mass is then treated with a suitable water immiscible solvent such as ethylene dichloride to effect separation of the degraded glycerides from the ammonium soap. The solvent may be removed from the glyceryl dioleate and glyceryl mono-oleate by distillation.

*Example II*

100 parts of a 45% aqueous solution of KOH are added to 350 parts of a mixture of olive and teaseed oils dispersed in diethylene glycol and the mixture warmed to about 43° C. to cause saponification of the oils. After this reaction has been completed, which usually takes about 20 minutes, the resulting composition will contain a clear mixture of potassium soap, mono and diglycerides of higher fatty acids, diethylene glycol and water. The glycerides may be recovered by treating the batch with a water soluble alkaline earth salt such as $CaCl_2$ to convert the water soluble soap into the water insoluble form after which the mass may be treated with a solvent such as ethyl alcohol, ethylene dichloride, isopropyl alcohol or the like, thereby extracting out the unreacted triglycerides and the mono and diglycerides. The amount of monoglycerides obtained by this process will be greater in proportion to the amount of the diglycerides formed.

The hereindescribed process offers many distinct improvements and advantages over the prior known methods of producing degraded glycerides. The process is economical due to the fact that inexpensive raw materials may be employed. Moreover, no heat need be supplied during the reaction as the preferred temperature range of 30° C. to 50° C. results at room temperature from the heat of reaction. The yield from the process of the invention is relatively high, which furthers the commercial adaption of this process.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. In a process of producing degraded glycerides of the higher fatty acids, the step which comprises partially saponifying a triglyceride of a higher fatty acid in the presence of an inert glycol derivative solvent vehicle with an alkali at a temperature not exceeding 50° C.

2. In a process of producing degraded glycerides of the higher fatty acids, the step which comprises partially saponifying a triglyceride of a higher fatty acid in the presence of diethylene glycol solvent with an alkali.

3. In a process of producing degraded glycerides of the higher fatty acids, the step which comprises partially saponifying a triglyceride of a higher fatty acid in the presence of diethylene glycol solvent with a strong alkali.

4. In a process of producing degraded glycerides of the higher fatty acids, the step which comprises partially saponifying a triglyceride of a higher fatty acid in the presence of diethylene glycol solvent with potassium hydroxide.

5. In a process of producing degraded glycerides of the higher fatty acids, the step which comprises partially saponifying a triglyceride of a higher fatty acid in the presence of diethylene glycol solvent with potassium hydroxide within a temperature range of 30° C. to 50° C.

6. In a process of producing mono and diglycerides of the higher fatty acids which comprises treating a triglyceride of a higher fatty acid, in the presence of an inert glycol derivative solvent vehicle, with a strong alkali in an amount sufficient only to react with one or two of the three available ester groups in the triglyceride molecule the reaction being carried out at a temperature not exceeding 50° C.

7. A process of producing mono and diglycerides of the higher fatty acids comprising partially saponifying a triglyceride in the presence of an inert glycol derivative solvent vehicle with an alkali at a temperature not exceeding 50° C. and separating the mono and diglycerides from the reacted mass.

8. A process of producing mono and diglycerides of the higher fatty acids which comprises treating a triglyceride, in the presence of diethylene glycol solvent, with potassium hydroxide in an amount sufficient only to react with one or two of the three available ester groups in the triglyceride molecule and separating the mono and diglycerides from the reacted mass.

9. In a process of producing glyceryl mono and dioleates, the step which comprises partially saponifying olive oil dispersed in diethylene glycol with an alkali.

10. A process of producing glyceryl mono and dioleate comprising dispersing olive oil in diethylene glycol solvent and treating the olive oil at 30° C. to 50° C. with potassium hydroxide in an amount sufficient to saponify not more than two of the three available ester groups in the triglyceride molecule.

11. A process of producing mono and diglycerides of the higher fatty acids which comprises treating a triglyceride, in the presence of diethylene glycol solvent, with a strong alkali in a molar ratio of one to one to two to one, acidifying the reacted mass to form two layers, removing the upper layer containing the mono and diglycerides and free fatty acids, saponifying the free fatty acids and extracting out the mono and diglycerides from the resulting mass by means of a water and soap immiscible solvent.

12. A process of producing mono and diglycerides of the higher fatty acids which comprises treating a triglyceride, in the presence of diethylene glycol solvent, with a strong alkali in a molar ratio of one to one to two to one, converting the soap in the reacted mass to a metallic soap and extracting the mass with a solvent to recover the mono and diglycerides.

ROLAND KAPP.